United States Patent Office 3,646,231
Patented Feb. 29, 1972

3,646,231
DIORGANOMAGNESIUM REAGENTS AND
METHODS OF PREPARING SAME
Conrad W. Kamienski, Gastonia, N.C., and Jerome F. Eastham, Knoxville, Tenn., assignors to Lithium Corporation of America, Bessemer City, N.C.
No Drawing. Original application May 13, 1968, Ser. No. 728,838. Divided and this application Mar. 5, 1970, Ser. No. 16,958
Int. Cl. C07f 1/00, 1/02
U.S. Cl. 260—665 R
2 Claims

ABSTRACT OF THE DISCLOSURE

Diorganomagnesium reagents are prepared by processes which separate halides as insoluble salts from magnesium reagents. The processes are convenient and practical and provide diorganomagnesium compounds and derivatives as solids or in solution with or without solvation; the processes have provided new diorganomagnesium compounds and derivatives and solutions of diorganomagnesium compounds never previously obtained. One principal process by which the separation is accomplished is precipitation of the salt lithium halide from reaction of an organolithium reagent with an organomagnesium halide or with a magnesium halide. A second process developed for separation of halide from a magnesium reagent involves formation of the salt magnesium halide from an organomagnesium halide in a medium that will not dissolve the salt. A third process involves reaction of magnesium directly with an organic halide under conditions that produce a mixture of magnesium halide and diorganomagnesium compound, the latter of which can be dissolved into suitable solvents leaving the halide as insoluble salt.

The present application is a division of Serial No. 728,838, filed May 13, 1968 now abandoned.

BACKGROUND OF THE INVENTION (1) Field of the invention

This invention is related generally to organometallic compounds and the preparation thereof and more particularly is directed towards diorganomagnesium reagents ($R_2Mg$), often called magnesium alkyls, and processes for making such reagents.

Organomagnesium halides (RMgX), commonly known as Grignard reagents, have wide utility in chemical reactions. By comparison with Grignard reagents, diorganomagnesium reagents have found less widespread use although such compounds undergo reactions analagous to those of organomagnesium halides. A primary reason for the use of the Grignard reagents over magnesium alkyls lies in the fact that heretofore there has been no easy method by which large amounts of diorganomagnesium compounds could be prepared. The present invention involves new techniques for the preparation of diorganomagnesium reagents, which reagents may be used for the purposes now served by Grignard reagents and by other organometallic compounds, particularly lithium alkyls (RLi). Both Grignard reagents and lithium alkyls are now commercially available. In general, the diorganomagnesium reagents can cost less to supply commercially that either the Grignard reagents or lithium alkyls if the cost is calculated per organic group (R) and includes both material costs and shipping cost. Furthermore, in various instances the $R_2Mg$ compounds are superior for chemical reasons. Relative to RLi compounds a particularly important superiority of the $R_2Mg$ compounds is their greater thermal stability and the lesser pyrophoric character of their ethereal solutions; the $R_2Mg$ compounds can even be used to stabilize hydrocarbon solutions of RLi compounds. Advantages relative to the RMgX compounds include solubility in hydrocarbon solvents and better yields obtained in numerous reactions of the $R_2Mg$ compounds.

Solutions of $R_2Mg$ compounds in saturated hydrocarbons are not known to have been previously prepared. In addition to the values of the solution based on their convenience as easily handled sources of $R_2Mg$ compounds for known applications, these hydrocarbon solutions are particularly valuable insofar as they afford $R_2Mg$ for one-step chemical reactions not attained with $R_2Mg$ in other solvents; they constitute a new catalyst system for multi-step reactions such as oligomerization and polymerization; and finally they may be used as a basic material from which other catalyst systems may be conveniently prepared.

The dialkylmagnesium compounds disclosed herein, are well as the intermetallic complexes with lithium alkyl, are valuable as reagents for the metallation of various organic compounds such as thiophene, anisole, resorcinol dimethyl ether, benzene, toluene, fluorene and others. They are also useful in various additions to unsaturated linkages in organic compounds such as ethylene, propylene, 1,1-diphenylethylene, stilbene, butadiene, isoprene and styrene. Their use in the processes of metallation,

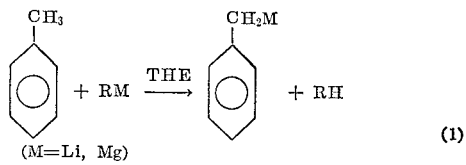

(M=Li, Mg)    (1)

and addition,

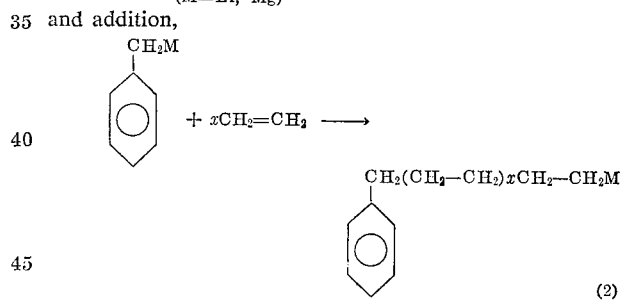

(2)

also make them useful as catalysts for telomerization and polymerization processes. An example of a telomerization process would be the reaction of toluene and ethylene in the presence of the organometallic complex and a Lewis base such as THF to produce a long chain alkylbenzene.

A typical polymerization process for which these compounds would be most useful would be the sterospecific polymerization of 1,3-butadiene or isoprene. No Lewis base is employed in this process, the polymerization being run in a hydrocarbon solvent. Such as sterospecific polymerization of isoprene, for example, yields a synthetic rubber very much like natural Hevea rubber, this rubber having almost exclusively a cis-1,4-mode of enchainment.

In addition to these applications, testing has shown that intermetallic alkyl complexes of lithium and magnesium possess a greater degree of stability than does the alkyl lithium component alone. The combination reagent possesses this additional dimension of utility and thus it may be shipped readily with greatly lessened danger of decomposition due to heat or contact with components of air.

(2) Description of prior art

When pure, dry magnesium is treated with an alkyl halide in the presence of a suitable solvent, usually ether, an important reaction takes place. The product, which forms readily with many alkyl halides, is known as a Grignard reagent. The reagent is most useful in chemical processes and its formation is expressed by the following reaction:

$$RX + Mg \rightarrow RMgX \qquad (3)$$

The Grignard reagent is an organomagnesium halide usually represented by RMgX. Although the best structural representation is somewhat in dispute, it is known that basic solvent molecules (e.g., diethyl ether, $Et_2O$) do associate more or less specifically with magnesium in the Grignard reagent. In the presence of such bases the reagent is said to be solvated and it is therefore sometimes represented as $RMgX \cdot Et_2O$, $(RMgX) \cdot (Et_2O)_2$, $(RMgX) \cdot solvated$ or other analogous symbolism. In agreement with these representations the crystalline structure of phenylmagnesium bromide and ethylmagnesium bromide, each crystallized from diethyl ether, have been determined by X-ray crystallography to be made up of units of $(RMgX) \cdot (Et_2O)_2$ in which the magnesium atom is bound essentially tetrahedrally, to the phenyl (or ethyl) group, halogen and two oxygen atoms. It is known that attempts to remove solvating base molecules (e.g., the $Et_2O$) from a crystalline Grignard reagent, that is to say to desolvate, apparently results in some change in structure; no complete structural determinations of the desolvated reagent have been reported; the desolvated reagent has appeared to be amorphous. Also, direct reaction of the organic halide RX with magnesium in the absence of a base, for example, in hydrocarbons, have yielded solid reagents whose exact structures are unknown but which react as do other Grignard reagents. Chemical reactions of Grignard reagents, as a class, have extensive use in synthetic organic chemistry. One of their uses has been the preparation of mercury reagents by metathetical exchange with mercury halide as indicated below.

$$2RMgX + HgX_2 \rightarrow R_2Hg + 2MgX_2 \qquad (4)$$

By comparison with Grignard reagents, diorganomagnesium compounds (i.e., magnesium alkyls and aryls, $R_2Mg$) have previously found less widespread use because of disadvantages in the known preparations of the diorganomagnesium compounds. The oldest and easiest preparation is from mercury alkyls by reduction with magnesium metal.

$$R_2Hg + Mg \rightarrow R_2Mg + Hg \qquad (5)$$

This process is limited by the high cost of mercury and the health hazard involved in its use. Actually the mercury alkyls themselves are commonly prepared from magnesium reagents. Also this reduction is ordinarily carried out in a basic medium comparable to that used in Grignard reagent synthesis, and conditions required to cause this reaction to go to completion in the absence of base would decompose many magnesium alkyls. A second process previously developed in the preparation of diorganomagnesium reagents involves removal of magnesium halide from solutions of Grignard reagents by precipitation of a complex the inorganic salt forms with dioxane, $C_4H_8O_2$.

$$2RMgX + C_4H_8O_2 \rightarrow R_2Mg + C_4H_8O_2 : MgX_2 \qquad (6)$$

The processing involved is somewhat tedious and obviously cannot be effected in the absence of a base since dioxane itself is basic. Diorganomagnesium reagents, like Grignard reagents, retain solvation in the solid state and complete removal (desolvation) of dioxane from these reagents has required particularly elaborate processing. Briefly, the difficulties in previously developed processes, as outlined above, present problems which prevent their being suitable for the manufacture of diorganomagnesium reagents in general and which make them unsuitable for the manufacture of the unsolvated reagents in particular. Contamination by mercury and/or tenacious retention of base by these reagents have presented difficulties.

It is therefore an object of the present invention to provide new and practical processes for the manufacture of diorganomagnesium compounds with and without solvation. Another object of this invention is to provide new and useful diorganomagnesium compounds and derivatives for a wide number of uses. Another object of this invention is to provide diorganomagnesium compounds in solutions never previously obtained.

DESCRIPTION OF THE PREFERRED EMBODIMENTS OF THIS INVENTION

In general, the present invention involves the preparation of diorganomagnesium reagents based upon the separation from the magnesium reagents of halides as insoluble salts. The separation is done without recourse to the use of complexing agents for these salts, so that if necessary, after separation the reagent can be easily desolvated. The separation is accomplished in several ways. A principal technique by which the separation is accomplished is that of precipitation of lithium halide, that is to say, by the metathetical exchange indicated below.

$$RMgX + RLi \rightarrow R_2Mg + LiX\downarrow \qquad (7)$$

After this precipitation, filtration of the LiX leaves a solution of $R_2Mg$. Chloride is preferred for the halide in this process because lithium chloride is relatively insoluble in solvents suitable for use with diorganomagnesium reagents. Because lithium chloride is insoluble in basic solvents such as diethyl ether, as well as in hydrocarbons, this exchange can be used to prepare solutions of the $R_2Mg$ reagents directly with or without their being solvated. If the solutions of $R_2Mg$ reagents are prepared in the presence of a base and it is desirable that this base be removed, it can be done by a process of desolvation. This desolvation process consists of continuously adding hydrocarbon to and distilling solvent from the solution of $R_2Mg$ reagent until no basic solvent remains in the solution.

An analagous metathetical exchange reaction $$MgX_2 + 2RLi \rightarrow R_2Mg + 2LiX\downarrow \qquad (8)$$

can be initiated with magnesium halide in place of the Grignard reagent. Again this exchange with lithium alkyl can be brought about in a basic solvent or in a hydrocarbon. In the latter case, it is advantageous to employ an activated magnesium halide and again the chloride is preferred.

A second technique by which the halide is separated from the organomagnesium reagents is by the formation of magnesium halide from the reagent in a medium that will not dissolve the salt. Again the use of chloride is preferred. Formation of magnesium halide from a Grignard reagent has been illustrated above at (2) but, in addition to the use there of dioxane to complex the $MgX_2$, it is probable that the use of dioxane or some other base is required in this reaction to facilitate or catalyze formation of $MgX_2$ from RMgX. It has been observed that insoluble $MgX_2$ is not, in general, reversibly formed from RMgX, a process sometimes referred to as the Schlenk equilibrium and written as:

$$2RMgX \rightleftharpoons R_2Mg + MgX_2 \qquad (9)$$

There is previously established evidence that this reaction is not necessarily a facile equilibrium, that is to say, it is not necessarily reversible and may require catalysts (e.g., another base) to occur even in ether. Additional evidence we find is that partial desolvation of etheral Grignard reagents (i.e., replacement of most but not all the base ether with a hydrocarbon solvent as described above) can produce a solution containing RMgX namely (i.e., containing R, Mg, and X in essentially equivalent amounts) in a solvent consisting largely of hydrocarbon with relatively little of the base ethyl (i.e., in a solvent designated hereinafter as HC>> base is mixed with an equivalent of $MgX_2$, the salt remains largely undissolved. On the other hand, if magnesium is reacted directly with RX in certain HC>>base solvents, we have discovered that $R_2Mg$ is obtained in solution and $MgX_2$ as a precipitate:

$$2RX + 2Mg \xrightarrow{HC >> base} R_2Mg + MgX_2\downarrow \quad (10)$$

This direct reaction of magnesium with RX under conditions that leave the halide as insoluble magnesium halide is the third principal technique embodied in this invention. Also, if the magnesium is reacted directly with RX in the absence of any solvent, the product consists of $MgX_2$ mixed with $R_2Mg$, the latter of which can be dissolved salt. From these observations on the Schlenk equilibrium and our other experimental work, we have developed convenient processes for reacting RX with Mg and producing $R_2Mg$ solutions directly, that is producing these solutions without the addition of complexing agents or lithium alkyls to cause precipitation of the halide. In those cases where direct agents or solutions containing some halide, our processes of desolvation or precipitation of LiX can be used, respectively.

Employing the techniques described above for their preparation some of the diorganomagnesium reagents have been found to be insoluble in hydrocarbons without base, that is to say, unsolvated. These insoluble reagents are represented hereinafter as $R_2'Mg$ or $R_2''Mg$. Hydrocarbon solutions of these unsolvated diorganomagnesium reagents can be provided by complexation. We find that by the proper admixture of examples of hydrocarbon soluble diorganomagnesium reagents (represented as $R_2Mg$) with the insoluble reagents, both dissolve in a hydrocarbon, as represented by:

$$R_2'Mg + R_2Mg \xrightarrow{HC} 2RMgR' \text{ in solution} \quad (11)$$

Ratios of R to R' may vary. We also find that two insoluble reagents can solubilize each other:

$$R_2'Mg + R_2''Mg \xrightarrow{HC} 2R'MgR'' \text{ in solution} \quad (12)$$

Further we find that lithium alkyls, RLi, will solubilize the hydrocarbon-insoluble $R_2'Mg$ reagents:

$$R_2'Mg + RLi \rightarrow (R'Li + R'MgR) \text{ in solution} \quad (13)$$

Using our discoveries of various diorganomagnesium reagent syntheses disclosed herein, several variations on how to prepare the hydrocarbon solutions of the complex reagents are possible.

Using solutions of diorganomagnesium reagents prepared by our processes, we have discovered that the chemical reaction of metallation can be used to prepare other like reagents. For metallation we have reacted organic compounds with more acidic hydrogen than that in an alkane with a dialkylmagnesium reagent. Examples of such compounds are aprotic aromatics, ArH, and terminal alkynes, $RC \equiv CH$, and their metallation is illustrated below:

$$ArH + R_2Mg \rightarrow ArMgR + RH \quad (14)$$

$$R'C \equiv CH + R_2Mg \rightarrow R'C \equiv CMgR + RH \quad (15)$$

Using solutions of diorganomagnesium reagents prepared by our processes we have discovered that solid complexes of the $R_2Mg$ reagents can be made with diamines such as triethylenediamine, TED, as shown below:

$$R_2Mg + TED \rightarrow R_2Mg \cdot TED\downarrow \quad (16)$$

SUMMARY OF THE INVENTION

The present invention features processes for the preparation of diorganomagnesium reagents in general, which processes have provided new diorganomagnesium reagents and derivatives in solid and liquid states, and in solution, and have provided the reagents with or without solvation. In general, the processes involve separation from the magnesium reagents of halides as insoluble salts. It is important to note that the separation is done without recourse to the use of complexing agents for the salts.

An outline of our processes is set forth below followed by specific examples.

TERMINOLOGY

For the purposes of accuracy in description, selected key words and symbols which appear herein are defined as follows:

Base—aprotic basic solvent such as an ether, oxacycloalkane, amine, azacycloalkane, sulfide, dioxacycloalkane, diazacycloalkane, etc.

HC—hydrocarbon solvent, aliphatic, aromatic, etc.

HC>>base—hydrocarbon containing relatively little base, which means containing approximately (but not limited to) 2 mole equivalents of base per gram atom of Mg, which often amounts to ca. 10±5% base by weight; specifically this HC>>base means base sufficient to expedite reaction and/or to solubilize $R_2'Mg$ (defined below) but insufficient to solubilize $MgX_2$.

DS—desolvation, removal of base from diorganomagnesium solutions by codistillation with HC.

R,R',R''—organic group or radical such as alkyl, cycloalkyl, aryl, aralkyl, etc.

X—inorganic group or radical, e.g., halide, amide, alkoxide, etc.

$R_2Mq$—diorganomagnesium reagent produced in significant concentration in HC solution for the first time by the practice of this invention.

$R_2'Mg$; $R_2''Mg$—diorganomagnesium reagent previously known to be, or discovered by this invention to be, insoluble in HC, ca., $10^{-1}$ M or less in solubility.

→ means chemical reaction and/or physical process, e.g., distillation or desolvation.

↑ means "into solution"

↓ means "out of solution"

SYNOPSIS OF EXAMPLES

*Note: If "base" appears in the process anywhere it remains with the organomagnesium reagent unless and until "DS." In some cases this remaining base is only ca. 0.5 mole equivalents (compared to Mg) but this is then sufficient to cause $R_2'Mg$ to be soluble (and in some cases, RMgX or R'MgX to be soluble) in "HC>> base." Thus those processes marked with an asterisk are capable of producing both $R_2Mg$ and $R_2'Mg$ solutions.

(I) Solutions of diorganomagnesium reagents:
(A) From exchange of Mg—X with R—Li
  (1) starting with base present, then DS if desired (a)
$$*MgX_2 + 2RLi \xrightarrow[\text{or base}]{HC >> base} R_2Mg + 2LiX\downarrow$$

or $$RMgX + RLi \xrightarrow[\text{or base}]{HC >> base} R_2Mg + LiX\downarrow$$

(b)
$$MgX_2 + 2RLi \xrightarrow[\text{or base}]{HC >> base} R_2Mg + 2LiX\downarrow$$

or $$RMgX + RLi \xrightarrow[\text{or base}]{HC >> base} R_2Mg + LiX\downarrow$$

$$\xrightarrow{DS} \text{ for HC sol}$$

(2) starting with no base present $$MgX_2 + 2RLi \xrightarrow{HC} R_2Mg + 2LiX\downarrow$$

or $$RMgX + RLi \xrightarrow{HC} R_2Mg + LiX\downarrow$$

(B) From direct synthesis
  (1) Starting with base present, then DS if desired (a)*
$$2RX + 2Mg \xrightarrow{HC >> base} R_2Mg + MgX_2\downarrow$$

(b)
$$2RX + 2Mg \xrightarrow{HC >> base} R_2Mg + MgX_2\downarrow \xrightarrow{DS} \text{ for HC soln}$$

(c)
$$2RX + Mg + 2Li \xrightarrow[\text{or base}]{HC >> base} 2LiX\downarrow + R_2Mg\uparrow$$

(d)
$$2RX + Mg + 2Li \xrightarrow[\text{or base}]{HC >> base} 2LiX\downarrow + R_2Mg \xrightarrow{DS} \text{ for soln.}$$

(2) starting with no base present (a)*
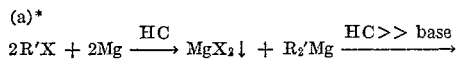

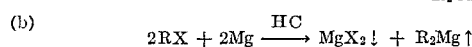

(b)
$$2RX + 2Mg \xrightarrow{HC} MgX_2\downarrow + R_2Mg\uparrow$$

(C) From removal of $MgX_2$ from 2RMgX starting with base present then DS if necessary (1) after exchange of Mg—X with R—Li

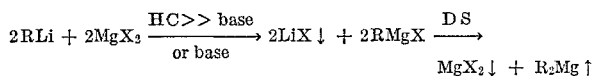

(2) after direct synthesis (a)
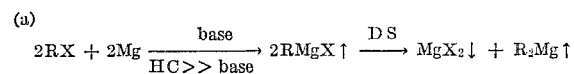

or (b)*
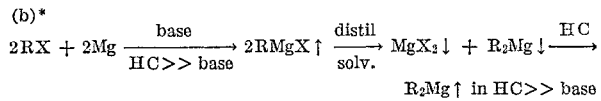

(c)
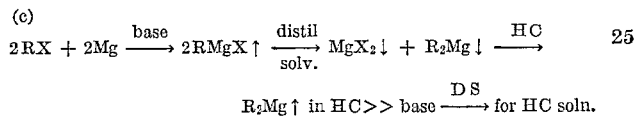

(D) From complexation of $R_2'Mg$ (1) starting with base present: prepare R'MgX in base or in HC>> base and use that for R'MgX in following:

(a)
$$\begin{cases} R'MgX+RLi \longrightarrow R'MgR+LiX \\ R'MgX+R''Li \longrightarrow R'MgR''+LiX \end{cases} \xrightarrow{\text{then DS}}$$

(b)
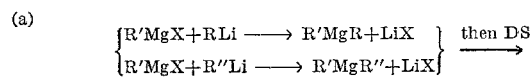

(2) starting with no base present: prepare $R_2'Mg$ in HC>> base by any of above applicable processes, $$\text{then} \xrightarrow{DS} R_2'Mg\downarrow$$

(a)
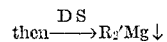
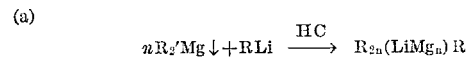

(b)
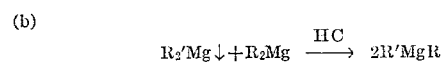

(II) Solid $R_2'Mg$ compounds:
(A) Pure reagents
(1) Symmetrical: diisobutyl magnesium, diisopropyl magnesium, di-n-butyl magnesium produced by distillation of solvents from solutions prepared as in (I) above
(2) Unsymmetrical: alkyl substituted arylmagnesium reagent such as s-butyl-2,6-dimethoxyphenylmagnesium, produced by metallation of resorcinol dimethyl ether with (s-Bu)$_2$Mg; alkylalkynylmagnesium reagents prepared analogously
(B) Complexes of $R_2'Mg$ with:
(1) triethylenediamine
(2) methyltriethylenediamine
(III) Preparation of activated $MgX_2$ (useful in synthesis of dialkylmagnesium reagents) typified in the following scheme by $MgCl_2$:
(A) From commercially available $MgCl_2 \cdot 6H_2O$ by:
(1) codistillation with a higher boiling alcohol such as isoamyl alcohol to remove water of hydration followed by codistillation with a hydrocarbon solvent such as xylene to remove the higher boiling alcohol
(2) reaction of the waters of hydration with an acid chloride such as acetyl chloride to produce $AC_2O$ followed by codistillation with a hydrocarbon to remove the anhydride
(B) From commercially available anhydrous $MgCl_2$
(1) by vogorous stirring of powdered anhydrous $MgCl_2$ with ethereal solvents such as ethyl ether followed optionally, by codistillation with a hydrocarbon to remove the ether.
(2) by stirring lump or powdered anhydrous $MgCl_2$ with anhydrous alcoholic solvents such as ethanol or isopropanol, followed by codistillation with a hydrocarbon as in (A)(1) above to remove the alcohol
(3) by stirring lump or powdered anhydrous $MgCl_2$ with other activating polar solvents such as acetone, acetic acid, etc., followed by codistillation as in (A)(1) to remove the polar solvents
(C) Precipitated $MgCl_2$ formed as a by-product of the following reactions:
(1) reaction of a Grignard reagent in an ethereal solvent with reagents such as the following, followed by filtration and codistillation with a hydrocarbon solvent to remove the ether from the salt:
(a) chlorine gas
(b) benzyl chloride or other "active" allylic halide
(c) HCl gas
(d) chlorosilanes such as dimethyldichlorosilane
(2) reaction of magnesium metal with an alkyl halide in a hydrocarbon medium
(3) reaction of magnesium metal with an alkyl halide in a hydrocarbon medium containing ca. 2 equivalents of an ether per equivalent of Mg followed by desolvation, if necessary, to effect precipitation of $MgCl_2$
(4) reaction of magnesium metal with an alkyl halide in an ethereal or HC>> ether medium followed by:
(a) vacuum stripping to remove free ether or solvents
(b) resuspension of the residue from (a) in a hydrocarbon solvent such as benzene or hexane in which the dialkylmagnesium reagent is soluble.

EXAMPLES OF THE PREPARATION OF ORGANOMAGNESIUM REAGENTS

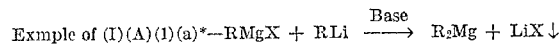

Preparation of di-t-butyl magnesium
(Cf. Whitmore & Bradsher, J. Am. Chem. Soc. 55, 1559–63 (1933) for prep. of t-butyl magnesium chloride.)

A weight of 2.43 g. (0.1 g. atoms) of magnesium powder (40 mesh) and a few crystals of iodine were placed in a 500 ml. round-bottom 4-neck flask equipped with a mechanical (Hershberg) stirrer, reflux condenser, thermometer, and 100-ml. graduated dropping funnel. The flask was heated to vaporize the iodine and then allowed to cool. Three to four milliliters of a solution of 9.3 g. (0.1 mole) of t-butyl chloride in 25 ml. of anhydrous ethyl ether was added to the flask in one portion. Reaction commenced almost immediately. After adding 25 ml. of ether to the reaction mixture in the flask, addition of the remainder of the halide solution was continued with refluxing and stirring.

After addition of 10 ml. of the halide solution, the remainder of the halide soltuion was diluted with 20 ml. of additional ether and addition continued over a period of 1 hour with vigorous stirring. A 3-ml. aliquot of the clear solution was analyzed for total alkalinity and found to contain 0.94 meq. per ml. of solution. The total 59 ml. of solution thus contained a total of ca. 56 meq. of t-butyl magnesium chloride, i.e., the yield was 56 percent.

By means of a syringe, 35 ml. of a 1.44 N solution of t-butyllithium in n-pentane was added rapidly to the stirred solution of Grignard reagent. Some heat was evolved and formation of a light gray precipitate of lithium chloride was noted. After it was stirred for a few minutes, the mixture was allowed to settle. Aliquots of the clear supernatant solution were withdrawn for chloride and total base analyses, which showed 0.50 meq. of chloride and 1.47 meq. of total base per ml. of solution. By means of a syringe, an additional 20 ml. of 1.44 N t-butyllithium solution was added rapidly to the stirred mixture and stirring continued for another hour. After allowing the mixture to settle, analyses of aliquots from the clear colorless supernatant solution showed 0.016 meq. of chloride, 0.016 meq. of lithium, 1.62 meq. of magnesium, 1.62 meq. of active alkyl, and 1.63 meq. of total base per ml. of solution. The yield of di-t-butyl magnesium solution thus obtained was essentially quantitative, based on t-butyl magnesium chloride.

This solution could not be freed of base (ethyl ether by codistillation with a hydrocarbon solvent due to facile decomposition to $MgH_2$ and butene-1. It could not be freed of base at ordinary temperatures by vacuum distillation at 0.1 mm. pressure.

Example (I)(A)(1)(a)*—$MgX_2 + 2RLi \xrightarrow{HC \gg base} R_2Mg + 2LiX \rightarrow$ Preparation of di-s-butyl magnesium The magnesium chloride used in the following preparation was produced as a solid by-product in the direct reaction of s-butyl chloride and magnesium turnings in a benzene solution containing dimethyl ether (DME).

To a stirred slurry of about 24 g. (0.25 mole) of magnesium chloride in 125 ml. of benzene was added 150 ml. of a 1.3 N s-butyllithium (0.2 mole) solution in cyclohexane. The temperature of the mixture rose to 35° C., and then slowly dropped to below 30°. After further stirring overnight, Gilman Color Test II(a) on the supernatant solution was negative. NMR analysis showed a ratio of 1.8 moles of DME to 1 mole of di-s-butyl magnesium. Another volume of 77 ml. of 1.3 N s-butyllithium (0.1 mole) solution was added to the stirred reaction mixture and after several hours. Color Test II(a) was again negative. A third charge of 77 ml. of s-butyllithium solution (0.1 mole) was added and after stirring for ca. 2 hours, Color Test II(a) was negative. Decantation yielded 365 ml. of a 0.98 N (0.36 mole, 90% yield) solution of di-s-butyl magnesium. Analysis of the solution for concentrations of total base, active alkyl and magnesium content showed the concentrations to be equivalent to each other within experimental error.

Example (I)(A)(1)(b)—$MgX_2 + 2RLi \xrightarrow{HC \gg base} R_2Mg + 2LiX \xrightarrow{DS}$ HC soln of $R_2Mg$ Desolvation of di-s-butyl magnesium Two hundred ninety milliliters of a clear 0.8 N solution obtained by reacting 360 ml. of 1.0 N s-butyllithium in n-hexane with 20.8 g. (0.22 mole) of powdered anhydrous $MgCl_2$ and 20 g. (0.44 mole) dimethyl ether with the aid of high-speed stirring, was placed in a 500-ml. 3-necked round-bottom flask equipped with an 18-inch Vigreux column attached to a distillation head, condenser, and distillate receiver. After distillation of 200 ml. of solvent, an equal volume of fresh hexane was added to the flask. Thereafter, five 40-ml. fractions of solvent were distilled consecutively. The percent DME in these five cuts were, respectively 1.8, 1.1, 0.83, 0.65 and 0.12.

A one milliliter sample of the residual solution (76 ml.) in the distilling flask was solvolyzed by adding it slowly (via a syringe to 3 ml. of isopropyl alcohol at 0° contained in a centrifuge tube fitted with a rubber septum. After centrifugation, the clear supernatant solution was analyzed by VPC for DME and n-butane, using an SE-30 (on chromosorb P) column operated at 42° C. (He flow rate=8). The percent DME in the original solution was 2.2. The percent DME based on n-butane found was 6.7. This analysis indicates a molar ratio of n-butane: DME of 12:1 or an initial molar ratio of di-s-butyl magnesium to DME of 6:1.

Ten milliliters of the above solution was further desolvated by distillation from a smaller flask attached to a Vigreux column and fractionating head. During the distillation, the hexane solvent was replaced with benzene. After distillation of about 50 ml. of solvent, some decomposition or cracking of the product began. NMR analysis of the residual solution showed the total absence of DME.

Example (I)(C)(1)—$2RLi + 2MgX_2 \longrightarrow 2RMgX + 2LiX \xrightarrow{DS} R_2Mg + MgX_2$ Preparation of di-n-butyl magnesium A weight of 25.5 g. (0.267 mole) of powdered anhydrous $MgCl_2$ and 100 ml. of anhydrous ethyl ether were placed in a 200-ml. round-bottom, 3-neck flask equipped with a magnetic stirrer and reflux condenser. To the stirred, cooled (ice bath) mixture was added all at once 30 ml. of 3.7 N n-butyllithium in benzene. After stirring for 2 hours, Color Test II(a) was negative. The mixture was stirred and allowed to come to room temperature overnight. Aliquots of the clear supernatant solution were withdrawn for analysis and found to contain 0.76 N total base, 0.76 N active alkyl and 0.88 N chloride. Thus, the product was in the form of n-butyl magnesium chloride, not di-n-butyl magnesium. Approximately 80 ml. of the clear supernatant solution was transferred to a dry 200 ml. 3-neck, round-bottom flask flushed with nitrogen and fitted with a rubber septum, vacuum-jacketed 12-inch Vigreux column, variable take-off fractionation head, and receiver. Fifty milliliters of cyclohexane was added and distillation begun. After distillation of 50 ml. of solvent and addition of another 50 ml. portion of cyclohexane, the head temperature reached 78° C. This process of distillation and replenishment of solvent to the residual solution was continued until a total of 250 ml. of solvent had been distilled. The residual solution was allowed to cool to room temperature. A total of 61 ml. of a quite mobile supernatant solution was withdrawn (some white solid left behind) and was found to contain 0.44 N total base, 0.42 N active alkyl and 0.01 N chloride. VPC analysis of a hydrolyzed sample (organic layer) showed less than 2 mole percent ethyl ether (based on di-n-butyl magnesium) to be present. Thus, about 50 percent of the original active alkyl content remainded in solution after removal of the ethyl ether.

Example (I)(A)(2)—$MgX_2 + 2RLi \xrightarrow{HC} R_2Mg + 2LiX \downarrow$ (a) Preparation of di-s-butyl magnesium from "activated" $MgCl_2$ To 10 ml. of a slurry of 4.8 g. (0.05 mole) of $MgCl_2$ (see following paragraph) in benzene contained in a centrifuge tube fitted with a rubber septum was added 20 ml. of 1.3 N s-butyllithium solution in cyclohexane. The mixture became warm on initial mixing of reagents, then cool while it was shaken thoroughly by hand for 10–15 minutes. The mixture was centrifuged and the supernatant, upon analysis, showed a negative Color Test II(a), 1.10 N total base, 1.02 N active alkyl, 1.09 N magnesium, and 0.03 N chloride content. NMR showed the expected sextet of lines at 9–9.5 indicative of the methine carbon, and VPC analysis of a sample of the hydrolyzed product (organic layer) showed n-butane as the major hydrocarbon resulting from hydrolysis. No alcoholic impurities were found.

The MgCl₂ used was formed as a solid by-product of the reaction between n-amyl chloride and magnesium powder in benzene following the procedure of Glaze and Selman. After withdrawal of the supernatant di-n-amylmagnesium solution in benzene, the MgCl₂ residue was washed four times with benzene in the centrifuge tube prior to reaction with s-butyllithium.

(b) Preperation of di-t-butyl magnesium from "activated" MgCl₂

To a slurry of 13.3 g. (0.14 mole) of MgCl₂ (see next paragraph) in 50 ml. of benzene was added, with stirring, 50 ml. of 1.8 N t-butyllithium solution in benzene. After the mixture was stirred for 45 minutes, Color Test II(a) was negative. Another 50 ml. of t-butyllithium solution was added and again Color Test II(a) was negative after 45 minutes of stirring. The flask was then stoppered and placed in the refrigerator overnight. NMR analysis of the supernatant solution showed only one (t-butyl) peak, no ethyl ether, and traces of pentane. About 150 ml. of clear solution was withdrawn into an amber bottle fitted with a serum cap. Analysis showed 0.83 N total base, 0.84 N active alkyl and 0.82 N magnesium content.

The MgCl₂ used above was prepared in the following manner. To a Grignard reagent, prepared from 0.4 mole of s-butyl chloride and 0.4 g. atoms of magnesium (turnings) in 150 ml. of anhydrous ethyl ether, was added, at reflux and with vigorous stirring, 50.6 g. (0.5 mole) of benzyl chloride (Baker analyzed reagent—99.8%). A precipitate began to form immediately and copious gas evolution was noted. (This gas was 1- and 2-butenes and n-butane.) After addition was complete, the mixture was stirred thoroughly and then allowed to settle overnight. Gilman Color Test I on the solution was negative. The MgCl₂ residue in the reaction flask was washed five times with 100 ml. portions of benzene, allowing the solids to settle each time before removing the wash. The fifth wash was found to still contain about 5 wt. percent ethyl ether. The slurry on analysis showed a 5.4 N Mg, 6.0 NCl, and 0.00 N total base content. Continued washing of the solids did not remove all of the ethyl ether, so the ether was removed by continuous codistillation with benzene. The final ether content (VPC) of the supernatant solution was found to be 0.016 wt. percent and the slurry was used as such for further reaction with organolithium compounds as described above.

(c) Attempted preparation of di-s-butyl magnesium from non-activated MgCl₂

A weight of 386 g. of lump anhydrous MgCl₂ was partially ground with a mortar and pestle in a Glove Bag under nitrogen. It was then transferred to a 1-quart capacity jar containing smooth stones (¼ to 1 inch diameter). Approximately 400 ml. of cyclohexane was added and the mixture was rolled mechanically overnight on a jar mill. The finely ground portion of the mixture was poured into 100-ml. amber bottles.

To the contents of one of these bottles (100 ml., 14 g. MgCl₂) was added 85 ml. of 1.3 N s-butyllithium in cyclohexane. The mixture was stirred overnight. Color Test II(a) was positive. The supernatant solution on analysis, showed a 0.11 N magnesium and 0.53 N total base content. Thus, the extent of exchange based on total alkalinity was only 21 percent.

(d) Preparation of di-s-butyl magnesium (1) Activation of commercial anhydrous MgCl₂: The remainder of the ball-milled cyclohexane slurry of anhyrous MgCl₂ (~40 g.) described in (c) above was treated with 150–200 ml. of isopropyl alcohol in a 500-ml. 3-necked round-bottom flask equipped with a Hershberg stirrer, jacketed Vigreux column and variable take-off fractionation head. Much heat was evolved and a considerable thickening of the mixture occurred on addition of the alcohol. After about 1 hour of vigorous stirring, 100 ml. of toluene was added and distillation begun to remove isopropyl alcohol as its toluene azeotrope. After distilling about 450 ml. of toluene, a sample of the slurry was hydrolyzed. Analysis of the slurry showed 1.1 moles MgCl₂ per ml. of slurry and 5 moles percent isopropyl alcohol based on MgCl₂. Distillation to remove isopropyl alcohol was continued; two 300-ml. portions of toluene were distilled. (Some reaction of the MgCl₂ was occurring since HCl appeared in the distillate.) VPC indicated the slurry now contained 2.5 mole percent isopropyl alcohol relative to the MgCl₂ present.

(2) Reaction of activated MgCl₂ with s-butyllithium: To 175 ml. of the above slurry containing 6.5 grams (0.068 mole) of MgCl₂ was added 90 ml. of 1.24 N s-butyllithium in hexane. The reaction mixture stirred vigorously, first at 40° C. for 1.5 hours, then at room temperature overnight. Color Test II(a) was negative. The supernatant solution on analysis showed a 0.32 N total base, 0.29 N active alkyl, and 0.28 N Mg content.

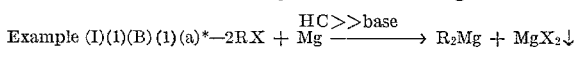

Example (I)(1)(B)(1)(a)*—2RX + Mg $\xrightarrow{HC \gg base}$ R₂Mg + MgX₂↓

Preparation of di-s-butyl magnesium

A weight of 2.43 g. (0.1 g. atom) of magnesium turnings and a few crystals of iodine were placed in a 500-ml. 3-necked flask fitted with a thermometer (−100 to +50°), mechanical stirrer, Dry Ice condenser and graduated dropping funnel. Enough dimethyl ether (DME) dried by passage over silica gel) was condensed into the flask to cover the turnings and 1–2 ml. of s-butyl chloride, from a total of 9.3 g. (0.1 mole) was added. After addition of a few drops of ethylene dibromide, the reaction appeared to begin as indicated by the disappearance of the iodine color and the development of a cloudy solution. The remainder of 100 ml. of DME was condensed into the flask −25° C. and the remainder of the s-butyl chloride was added. Reaction was slow and 100 ml. of cyclohexane was added gradually to the flask. The mixture was allowed to warm slowly to room temperature and allowed to stir at room temperature for two days. A white slurry formed during this time. The reaction mixture was heated to 45° C. for 2 hrs., resulting in almost complete disappearance of the magnesium turnings. The reaction mixture was allowed to cool and settle overnight. Analysis of the clear supernatant solution showed a 0.77 N total base and 0.085 N chloride content. Thus, the yield of di-s-butyl magnesium appeared to be approximately 90%.

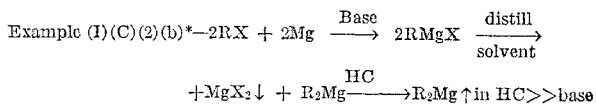

Example (I)(C)(2)(b)*—2RX + 2Mg $\xrightarrow{Base}$ 2RMgX $\xrightarrow[solvent]{distill}$ +MgX₂↓ + R₂Mg $\xrightarrow{HC}$ R₂Mg↑ in HC≫base Preparation of di-s-butyl magnesium A solution of Grignard reagent, prepared from 9.7 g. (0.4 g. atom) of magnesium turnings and 37 g. (0.4 mole) of s-butyl chloride in 150 ml. of anhydrous ethyl ether, showed upon analysis a total base concentration of 2.20 N and an active alkyl concentration of 2.13 N. Eighty-five milliliters of this solution was transferred to a 200-ml. 3-necked round-bottom flask equipped with a capillary tube for admitting nitrogen below the liquid level and a distillation head leading to a receiver and vacuum line. The flask was heated with an oil bath. Solvent was removed under vacuum to about 3–4 mm. pressure (oil bath temperature −75° C.). The mixture eventually became quite viscous and slowly evolved ether. The residue was evacuated for 12 hours at this temperature. After returning to room temperature and atmospheric pressures, the flask contents, a viscous mass, were stirred with about 50 ml. of benzene. The mixture thinned out, with a granular white precipitate being evident in the mixture. On analysis, an ethyl ether to di-sec-butyl magnesium ratio (molar basis) of 0.7 was found. The solution had a total base concentration of 1.7 N and could be desolvated by continuous codistillation with a hydrocarbon solvents as described above. The solids in the slurry were washed several times with benzene, which completely removed all ethyl ether, and successfully reacted with s-butyllithium in cyclohexane to give a desolvated solution of di-s-butyl magnesium.

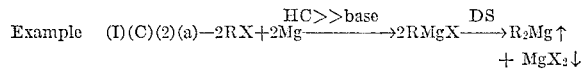

Preparation of di-s-butyl magnesium

A weight of 10 g. (0.514 g. atoms) of magnesium turnings were activated with iodine and mixed with 200 ml. of benzene and 50 ml. of anhydrous ethyl ether. The mixture was heated to reflux and 42 ml. (0.39 mole) of s-butyl chloride added portionwise to the vigorously stirred mixture. After 16 ml. of the halide had been added, reaction was initiated by addition of a small portion of s-butyl magnesium chloride in ether. The reaction proceeded vigorously and intermittent cooling with an ice-bath was necessary. When the initial reaction had subsided, slow halide addition was continued. The reaction mixture was heated at reflux (77° C.) for 1 hr. and then allowed to cool to room temperature. No MgCl$_2$ precipitate was in evidence at this time. Total base concentration was found to be 1.33 N indicating the yield of s-butyl magnesium chloride to be essentially quantitative. The solution was allowed to stand overnight, still no precipitation was evident.

Thirty milliliters of this solution was placed in a distillation apparatus as described above and desolvation carried out as previously described. Slow precipitation of of MgCl$_2$ began as soon as solvent started distilling. When between 10 and 15 ml. of solvent had been removed, the mixture was allowed to cool and settle. Analysis of the supernatant showed a 2.48 N total base and 1.85 N chloride content. The molar ratio of ether to carbon bound magnesium was 2:1. Thus, removal of 40–50% of the solvent resulted in precipitation of 25% the MgCl$_2$, leaving an equivalent amount of di-s-butyl magnesium in solution.

In another experiment in which all the ethyl ether was distilled from a comparable solution, a halide and ether-free solution of di-s-butyl magnesium resulted.

Example (I)(B)(2)(a)*—2R′X + 2Mg $\xrightarrow{\text{HC}\gg\text{base}}$ MgX$_2$↓ + R′$_2$Mg↓ R$_2$Mg↑

Preparation of di-n-butyl magnesium

A weight of 2.43 g. (0.1 g. atoms) of magnesium metal powder (40 mesh) was heated with a crystal of iodine in a few ml. of cyclohexane. A few ml. of a solution of 9.25 g. (0.1 mole) of n-butyl chloride in 80 ml. of cyclohexane was added to the mixture. The iodino color disappeared and a cloudiness formed in the solution. The mixture was heated to reflux and the remainder of the halide solution was added over a period of 2 hr. with vigorous stirring with a high-speed stirrer. Stirring and refluxing were continued for several hours after addition of the halide solution was complete. A white crystalline precipitate formed on the walls of the flask during this time. After the reaction mixture was cooled, the white precipitate was found to contain active alkyl, but none was found dissolved in the supernatant solution. Dimethyl ether was slowly bubbled into the mixture with some of the white solid dissolving. The mixture was allowed to settle and the clear yellow supernatant solution found to be 0.58 N in total base; yield of di-n-butyl magnesium—ca. 60%.

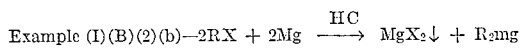

Preparation of di-n-amyl magnesium

Into a 200-ml. 3-necked, round-bottom flask equipped with Hershberg stirrer, reflux condenser, and 100-ml. graduated dropping funnel was placed 2.68 g. (1.1 g. atom) of magnesium turnings (under nitrogen) and a crystal of iodine. The flask was heated to 85° by means of an oil bath and 1–2 ml. from a total of 10.6 g. (0.1 mole) of 1-chloropentane was added. The reaction began readily with disappearance of iodine color and the appearance of fuming. The remainder of the halide was added over a 1 hr. period while vigorous stirring and heating at reflux was maintained. About 1 hr. after addition was complete, everything in the flask became dry and lumpy. Fifty milliliters of benzene was added with vigorous stirring and heating at reflux. After 1 hr. another 50 ml. of benzene was added and stirring and heating continued for an additional 3–4 hours. The mixture had become viscous during this time and was allowed to cool and settle overnight. The mixture was centrifuged. On analysis, the clear colorless viscous supernatant solution showed a 0.27 N total base and 0.25 N active alkyl content, but no residual 1-chloropentane. n-Pentane was the only hydrolysis product found to be present.

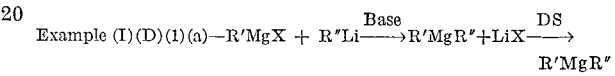

Preparation of methyl isobutyl magnesium

A solution of Grignard reagent was prepared from 0.2 g. atoms of magnesium (turnings) and 0.2 mole of isobutyl chloride in 200 ml. of anhydrous ethyl ether (92 percent yield). To this solution was added as rapidly as possible with stirring 200 ml. of a 0.92 N solution of methyllithium in ethyl ether. The mixture was stirred for 2 hr. and then allowed to settle overnight. The clear supernatant solution (analysis of which showed a ratio of Mg:Li:Cl of 16:1:3) was placed in the distillation apparatus. The ether was distilled and replaced with benzene. The viscous residual solution was centrifuged and the clear viscous supernatant solution on analysis showed a 1.45 N total base and a 1.41 N active alkyl content. Both VPC and NMR indicated a slight excess of methyl over isobutyl groups, ca. 1.2–1.3 methyls to one isobutyl.

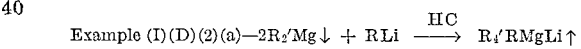

Preparation of mixed soluble s-butyllithium and n-butyllithium-di-n-butyl magnesium complexes

(a) Preparation of di-n-butyl magnesium

A weight of 16.7 g. (0.176 mole) of powdered anhydrous MgCl$_2$ was mixed with 75 ml. of anhydrous benzene in a nitrogen-flushed 200-ml., 3 necked, round bottom flask equipped with reflux condenser, serum cap and magnetic stirring bar. Thirty milliliters of anhydrous ethyl ether (0.3 mole) was added followed by 30 ml. of 3.7 N n-butyllithium in benzene. The mixture became warm and was cooled and stirred in an iced bath for 1–2 hr. After allowing the mixture to come to room temperature, it was stirred overnight; analysis of the clear supernatant showed a negative Color Test II(a) and 0.8 N total base and 0.3 N chloride ion content. One hundred ten milliliters of the clear supernatant solution was transferred to a 200-ml. flask fitted for distillation as described above and 9.2 ml. of 3.7 N n-butyllithium in benzene added to react with the chloride ion present in solution. After it was stirred 30 min., the solution was analyzed for chloride ion. None was found. The ether was distilled using benzene as codistillate. After 200 ml. of benzene had been distilled, the slurry was checked for ether by VPC and ether still found to be present. The slurry was then heated to 120°, almost to dryness, while another 70–80 ml. of distillate was collected. Benzene was added back to a volume of 100 ml. and the mixture allowed to stir and cool to room temperature.

(b) Preparation of soluble butyllithium-butyl magnesium complexes

Three 5 ml. aliquots of the stirred slurry were placed in nitrogen-flushed centrifuge tubes fitted with serum caps.

The following reagents were added to each tube: 0.81 ml. of 1.24 N s-butyllithium in cyclohexane (tube No. 1); 0.625 ml. of 1.6 N n-butyllithium in hexane plus 0.2 ml. of cyclohexane (tube No. 2); 0.81 ml. of cyclohexane (tube No. 3). The tubes were shaken well, centrifuged and analyzed for total base and ethyl ether (by NMR) content. The total base content in each of the three tubes was as follows: 4.70 meq. in tube 1, 4.47 meq. in tube 2, and 0.70 meq. in tube 3. The residue in tube 3 was dissolved in THF and found to contain 3.88 meq. total base. Thus the total base content present in 5 ml. of original slurry was 4.58 meq. The percentage solubilization of the di-n-butyl magnesium by n- and sec-butyllithium calculated from these data was 76 percent and 81 percent respectively. Subtracting the amount of di-n-butyl magnesium itself soluble in this medium (determined with tube 3 above), the mole ratios of di-n-butyl magnesium to n-butyllithium and sec-butyllithium in the solutions were found to be 1.9 and 2.0 respectively.

Example (I)(D)(2)(b)—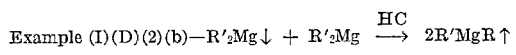

(a) Preparation of a soluble diisobutyl-di-s-butyl magnesium complex

To 0.35 g. (5.0 meg.) of solid diisobutyl magnesium (prepared by reaction of isobutyl magnesium chloride with isobutyllithium in ethyl ether followed by desolvation with cyclohexane) was added 5 ml. of a 1.35 N di-s-butyl magnesium solution in n-hexane and 2.5 ml. of cyclohexane. Complete dissolution of the diisobutyl magnesium (which was previously found to be soluble to the extent of only 0.09 mole/liter in cyclohexane) occurred, yielding a solution having a total base concentration of 1.56 N, which may be compared to a calculated value of 1.57 N.

(b) Preparation of a soluble diisobutyl-di-t-butyl magnesium complex

To 0.8167 g. (10.86 meg.) of solid diisobutyl magnesium suspended in a few ml. of benzene was added 7.54 ml. of 1.57 N di-t-butyl magnesium in benzene (unsolvated). After thorough mixing and centrifugation, the clear supernatant solution was analyzed for the ratio of t-butyl to isobutyl groups by NMR. An approximate 1:1 ratio was found, based on the ratio of t-butyl protons to methyl protons (in the isobutyl groups).

(c) Preparation of a soluble di-n-butyl-di-t-butyl magnesium complex

To a slurry of 13.3 g. (0.14 mole) of activated $MgCl_2$ (ether-free) in 50 ml. of benzene was added with stirring 40 ml. of 1.75 N. t-butyllithium in benzene. After stirring the mixture for 15–20 minutes, 19 ml. of 3.7 N n-butyllithium in benzene was added. The mixture immediately became quite warm. After stirring until cool, analysis of the supernatant solution showed a negative Color Test II(a) and 1.03 N total base content. NMR analysis showed a t-butyl to n-butyl group ratio of 1:0.8.

Example (II)(A)(1)—Solid $R_2Mg$ compounds—Symmetrical $R_2Mg$

Preparation of diisobutyl magnesium

To a solution of Grignard reagent (prepared from 2.43 g. (0.1 g. atoms of magnesium turnings and 9.3 g. (0.1 mole) of isobutyl chloride in 100 ml. of ethyl ether in 90 percent yield) was added 90 ml. of a 0.96 N solution of isobutyllithium in ethyl ether (prepared from 1.4 g. (0.2 g. atom) of lithium metal wire (containing 0.8 percent sodium) and 9.3 g. of isobutyl chloride in 100 ml. of ethyl ether in 87 percent yield). The mixture was refluxed for 5–10 minutes and was allowed to stir for 5–10 minutes longer and then to settle. Analysis of the supernatant solution showed 0.84 N total base, 0.02 N chloride, 0.88 N Mg and 0.02 N Li. The clear supernatant solution was transferred to a distillation unit, and the ethyl eher distilled with the aid of cyclohexane until the ether concentration in the distillate was 20–30 p.p.m. (VPC). A white precipitate formed during the distillation. The mixture was allowed to cool and the white solid filtered off on a sintered glass (M) filter funnel under nitrogen. The solid was washed with dry n-pentane, blown dry with argon and transferred to weighed vials fitted with septa in a dry box. Analysis of the solid for total base and ethyl ether content showed it to possess an N.E. of 66 (theory, 69) and no ethyl ether. It had a solubility in benzene of 0.135 meg./ml.

Example (II)(A)(2)—Unsymmetrical $R_2Mg$

Preparation of s-butyl-2,6-dimethoxyphenylmagnesium

A solution of 34 ml. of 0.77 N (13.5 moles) di-s-butyl magnesium in mixed hexane-cyclohexane solvent and 3.8 ml. (2.7 moles) of resorcinol dimethyl ether were heated to reflux (oil bath) overnight. Large lacey crystals formed in the mixture. After the reaction mixture had cooled and was transferred to a glove bag, the crysatls were transferred from the mixture with forceps to a centrifuge tube and 1 ml. of THF added. The clear THF solution formed was analyzed by NMR and found to possess the following characteristics: aromatic region shows two signals, 2:1 ratio of protons ortho and meta to methoxy groups in metallated resorcinol dimethyl ether (DMR); aliphatic region shows methine proton like that in $(s\text{-}Bu)_2Mg$ in 1:1 ratio to meta proton in metallated DMR.

No di-s-butyl magnesium (only unreacted DMR) was present in the supernatant solution above the crystals in the original reaction solution.

Example (II)(B)(1)—Complexes of $R_2Mg$ with triethylenediamine

Preparation of dis-s-butyl magnesium-triethylenediamine complex

To 5.0 ml. of a 0.85 N solution of di-s-butylmagnesium (2.13 mmoles) in benzene-cyclohexane (unsolvated) in a nitrogen-flushed dry centrifuge tube fitted with a serum cap was added 3.0 ml. of a 0.69 M solution of triethylenediamine (TED) in cyclohexane (2.07 mmoles). A crystalline precipitated formed immediately. After shaking the mixture thoroughly, it was centrifuged and the solids washed twice with cyclohexane. NMR analysis of a solution of the solid in THF showed a triethylenediamine (all protons equivalent) to di-s-butylmagnesium (methine proton) ratio of 0.9±0.1.

In another experiment, 3.2 ml. of 0.69 M TED (2.2 mmoles) in cyclohexane was added to 9.0 ml. of 0.98 N di-s-butylmagnesium (4.4 mmoles) in benzene. A fine-grained white crystalline precipitate was formed which was centrifuged and the solids were washed 3 times with n-pentane. The centrifuge tube was heated in an oil bath at 80–90° and the solids blown dry with nitrogen. The tube was transferred to a glove bag and some of the dry solid transferred to a dry nitrogen-flushed melting point capillary. The melting point capillary was quickly sealed in a flame. The solid melted with decomposition (gas evolution) at 201–203° C. The remaining solid in the centrifuge tube was weighed on an analytical balance (0.5159 gram) and dissolved in 5 ml. of anhydrous THF. Active alkyl analysis of this solution showed the presence of 2.09 mmoles of di-sec-butylmagnesium. The equivalent weight of the solid thus obtained was 248 (theory for $(C_4H_9)_2Mg \cdot C_6H_{12}N_2$, 250).

In a similar manner there were prepared 1:1 complexes of triethylenediamine and di-n-butyl magnesium and di-tert-butyl magnesium. No crystalline precipitate was formed when a di-n-amyl magnesium solution in benzene was treated with an excess of 0.69 MTED solution, regardless of cooling or concentration of the solution.

Example (II)(B)(2)—Complexes of R₂Mg with methyl triethylenediamine

Preparation of di-s-butyl magnesium-methyl triethylenediamine complex

A volume of 5.5 ml. of 0.85 N di-s-butyl magnesium solution in benzene-cyclohexane (unsolvated) was added to a centrifuge tube containing 0.3 ml. of methyl triethylenediamine (MTED) dissolved in 30 ml. of benzene (7.92 moles/ml.). The fine crystalline precipitate which formed slowly was centrifuged and the supernatant solution drawn off. The solid (0.54 g.) was recrystallized from 8–10 ml. of benzene to give monoclinic prisms, which on washing and drying (as described for TED complexes) melted at 160° C. (dec.) in a sealed tube. NMR analysis of a solution of these crystals in THF showed the presence of a 1:1 (s-Bu)₂Mg·MTED complex based on integration of the methylene plus methine protons of the MTED and the methine proton of the di-s-butyl magnesium.

Similarly there was prepared the 1:1 di-tbutyl magnesium-MTED complex. Recrystallization from benzene gave star-saped prisms—M.P. 163° (dec.). No crystalline precipitate was formed between MTED and di-n-butyl magnesium, regardless of cooling or concentration of the solution.

Example (III)(A)(1)—Preparation of activated MgCl₂ from commercially available MgCl₂·6H₂O A weight of 40.6 g. (0.2 mole) of MgCl₂·6H₂O was placed in a 3-necked 500-ml. flask equipped with Hershberg stirrer and attached to a Dean-Stark trap. Three hundred milliliters of isoamyl alcohol was added and the mixture heated (and stirred) to the boiling point. A total of 13.5 ml. of water, from a theoretical amount of 21.6 g., was collected in the trap during a period of 4–5 hr. No further removal of water occurred during several more hours of distillation. The isoamyl alcohol was then distilled to a residual volume of 50 ml. The MgCl₂ was soluble at the distillation temperature, but upon cooling to room temperature, the entire mixture solidified. One hundred milliliters of Tetralin was added to the solidified mixture and the contents of the flask heated of reflux. The mass again became a clear liquid. Tetralin and isoamyl alcohol were distilled. Another 100 ml. portion of Tetralin was added and the distillation was continued. A crystalline precipitate formed during this stage of the distillation. The distillate was acidic indicating some loss of HCl, presumably to form an oxychloride (ClMgOCl). After hydrolysis of a sample of the slurry, VPC of the upper layer on Carbowax 400 at 150° showed only a trace of isoamyl alcohol to be present. Reaction of this slurry with 100 ml. of a 1.20 N solution of s-butyllithium in hexane followed by analysis of the clear supernatant (Color Test II(a)—negative) showed a 0.62 N total base and 0.44 N active alkyl content. The analysis indicated complete exchange of Li and Mg.

Using powdered anhydrous MgCl₂ as obtained from Alfa Inorganics in place of the above "activated" MgCl₂, little or no observable exchange occurred even with the high speed stirring generated by a Stir-O-Vac apparatus (Cole-Parmer). Using anhydrous MgCl₂ (Dow) "ball-milled" as described above in Example (I)(A)(2)(c), only a 21 percent exchange occurred.

Example (III)(B)(1)—Activation of anhydrous MgCl₂ with ethereal solvents

About 150 grams of powdered anhydrous MgCl₂ was placed in a 500-ml. Morton flask equipped with a Stir-O-Vac high speed stirrer and reflux condenser.

About 250 ml. of anhydrous ethyl ether was added and the mixture stirred vigorously for several hours. The mixture thickened appreciably and could no longer be stirred effectively. Benzene was added and distillation carried out to remove ethyl ether. As the ether was being removed, the mixture became thinner and was readily stirred. After distillation of 400 ml. of benzene, the mixture was allowed to cool and settle. VPC analysis showed only a trace of ether present in the supernatant (ca. 0.01%).

Forty milliliters of this slurry was centrifuged, the supernatant drawn off and 20 ml. of 1.3 N s-butyllithium in cyclohexane added. The mixture was shaken by hand and heat of reaction noted. After shaking until the mixture became cool to the touch, Color Test II(A) was positive. More of the slurry was added and the mixture stirred overnight. Color Test II(a) was then negative.

Example (III)(B)(2)—Activation of anhydrous MgCl₂ with alcoholic solvents (a) Powdered MgCl₂—Cf. Examples (I)(A)(2d) (above)

(b) Lump MgCl₂

Lumps (¼ inch in diameter) of anhydrous MgCl₂ on trituration with isopropyl alcohol, broke up into a powder with concomitant thickening of the slurry. This slurry was desolvated as described in Example (I)(A)(2d) (above) and reacted successfully with organolithium compound.

Example (III)(C)(1)

(a) Preparation of activated MgCl₂ by reaction of a Grignard reagent with chlorine A Grignard reagent was prepared from 24.3 g. (1.0 g. atom) of magnesium turnings and 92.5 g. (1.0 mole) of s-butyl chloride in 500 ml. of anhydrous ethyl ether. Chlorine gas, diluted with argon, was bubbled into the stirred solution for 3 hrs. A thick, porridge-like mass formed in the flask with refluxing of the solvent. Benzene was added followed by distillation to remove most of the ether. Analysis of the supernatant solution for total base showed that a 70% consumption of s-butyl magnesium chloride had occurred. This solution was drawn off and the solids washed three times with benzene on a sintered glass funnel. The salts were transferred to a distillation unit (as described previously) and the ether distilled with the aid of benzene and then cyclohexane. Distillation was continued until a hydrolyzed sample of the slurry (organic layer) showed the presence of less than 0.2 wt. percent ethyl ether (less than 1 mole percent ethyl ether based on MgCl₂). Fifty milliliters of the slurry was reacted with 50 ml. of 1.3 N s-butyllithium in cyclohexane. Heat was noted and after 20 minutes, Color Test II(a) was negative.

(b) Preparation of activated MgCl₂ by reaction of a Grignard reagent with benzyl chloride Cf. Example (I)(A)(2)(b) (above) for description of this preparation.

Example (III)(C)(2)—Preparation of activated MgCl₂ by reaction of magnesium metal with an alkyl halide in a hydrocarbon Cf. Example (I)(A)(2)(a)(above).

Example (III)(C)(3)—Preparation of activated MgCl₂ by reaction of magnesium metal with an alkyl halide in a hydrocarbon medium containing ca. 2 equivalent of an ether per equivalent of magnesium A weight of 9.7 g. (0.4 g. atom) of magnesium turnings were activated with iodine and covered with 100 ml. of dry benzene. Ten grams (0.2 mole) of dimethyl ether was passed into the mixture and then 2.3 ml. of isopropyl chloride. No reaction occurred. After about one-third of a solution of 31.4 g. (0.4 mole) of isopropyl chloride in 125 ml. of benzene had been added, reaction began as evidenced by a rise in temperature. Intermittent cooling with an ice bath kept the temperature between 35 and 45° C. while addition of the halide solution was continued over a 1–2 hr. period. During this time an additional 34 g. (0.74 mole) of dimethyl ether was added. The reaction mixture was stirred and heated for 1–2 hrs. (50° C.). The mixture was then allowed to cool and settle overnight. One hundred fifty milliliters of the clear colorless supernatant solution was drawn off and analyzed for total base and active alkyl content. Found: total base=1.45 N, active alkyl=1.35 N.

The remainder of the slurry of $MgCl_2$ and unreacted magnesium turnings was transferred to two 50 ml. centrifuge tubes and centrifuged. Sixty milliliters of the supernatant solution was drawn off and combined with the main product solution. (Yield of diisopropyl magnesium=80%).

The solid (0.08 mole of $MgCl_2$) in one of the tubes was washed with benzene, resuspended in 40 ml. of benzene, and transferred to a 200-ml. 3-necked flask equipped with a magnetic stirring bar. To the stirred slurry was added 83 ml. of a 1.44 N t-butyllithium solution in pentane. The mixture was stirred for several hours and then allowed to settle. Color Test II(a) on the supernatant solution was negative indicating complete exchange of Li and Mg.

Example (III)(C)(4)—Preparation of activated $MgCl_2$ by vacuum stripping of solvent from a Grignard reagent followed by extraction of dialkyl magnesium with a hydrocarbon solvent

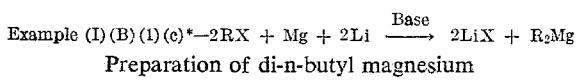

Example (I)(B)(1)(c)*—$2RX + Mg + 2Li \xrightarrow{Base} 2LiX + R_2Mg$

Preparation of di-n-butyl magnesium

A volume of 150 ml. of ether and 2.5 g. (0.1 g. atom) of magnesium (turnings) were placed in a 500-ml., 3-neck flask equipped with reflux condenser, mechanical stirrer, and dropping funnel. A crystal of iodine and 5 ml. of a solution of 17.5 g. (0.19 mole) of n-butyl chloride in 25 ml. of ether were added. After the reaction began, a weight of 4.7 g. of lithium dispersion (30 weight percent in mineral oil) containing 1.4 g. lithium metal (0.2 g. atom) was also added. There was a slight heat of reaction on mixing the reagents. The remainder of the n-butyl chloride solution was added over a 1 hr. period and the mixture stirred for 15–20 minutes longer. It was then cooled to room temperature and allowed to settle. Analysis of the supernatant solution showed a 1.04 N total base, 0.39 N Li, 0.60 N Mg and 0.02 N Cl content. The yield of di-n-butyl magnesium was 60% (based on n-butyl chloride).

We claim:

1. The method of preparing mixed soluble butyl lithium-butyl magnesium complexes from complexation of a diorganomagnesium reagent normally insoluble in a hydrocarbon medium, comprising the steps of:

(a) preparing a normally hydrocarbon insoluble dibutyl magnesium reagent in a hydrocarbon medium containing relatively little base, said base being present in an amount sufficient to solubilize the normally insoluble reagent but insufficient to solubilize magnesium halides, (b) desolvating said reagent to produce a normally hydrocarbon-insoluble diorganomagnesium reagent out of solution, (c) reacting said normally hydrocarbon-insoluble diorganomagnesium reagent with lithium butyl in a hydrocarbon solvent to produce in solution mixed soluble butyl lithium-butyl magnesium complexes.

2. The method of preparing mixed soluble diisobutyl magnesium -di (sec or tert) butyl magnesium complexes, comprising the steps of:

(a) preparing a normally hydrocarbon-insoluble diisobutyl magnesium reagent in a hydrocarbon medium containing relatively little base, said base being present in an amount sufficient to solubilize the normally insoluble reagent but insufficient to solubilize magnesium halides, (b) desolvating said reagent to produce a normally hydro-carbon-insoluble diisobutyl magnesium reagent out of solution, (c) reacting said normally hydrocarbon-insoluble diisobutyl magnesium reagent with a hydrocarbon-soluble di-sec-butyl or di-tert butyl magnesium reagent in a hydrocarbon solvent to produce in solution soluble diisobutyl magnesium -di(sec or tert) butyl magnesium complexes.

References Cited

Coates: Organo-Metallic Compounds, John Wiley & Sons, New York, N.Y., 1960, p. 54.

Wittig et al.: Annalen der Chemie, 571, p. 167, 190–1.

Glaze et al.: J. Organometal. Chem 5 (1966) pp. 477–480.

TOBIAS E. LEVOW, Primary Examiner

A. P. DEMERS, Assistant Examiner

U.S. Cl. X.R.

252—431 R; 260—94.2 R, 94.2 M, 665 G, 671